United States Patent
Sievert et al.

(10) Patent No.: US 12,031,877 B2
(45) Date of Patent: Jul. 9, 2024

(54) MEASURING ARRANGEMENT INCLUDING MOUNTING SYSTEM AND METHOD OF USE THEREOF

(71) Applicant: KROHNE Messtechnik GmbH, Duisburg (DE)

(72) Inventors: Dietmar Sievert, Bottrop (DE); Marcus Wilms, Duisburg (DE)

(*) Notice: Subject to any disclaimer, the term of this patent is extended or adjusted under 35 U.S.C. 154(b) by 218 days.

(21) Appl. No.: 17/662,968

(22) Filed: May 11, 2022

(65) Prior Publication Data

US 2022/0364946 A1     Nov. 17, 2022

(30) Foreign Application Priority Data

May 12, 2021    (DE) .................... 10 2021 112 448.4

(51) Int. Cl.
     *G01L 19/14*      (2006.01)

(52) U.S. Cl.
     CPC .......... *G01L 19/147* (2013.01); *G01L 19/143* (2013.01)

(58) Field of Classification Search
     None
     See application file for complete search history.

(56) References Cited

U.S. PATENT DOCUMENTS 5,381,697 A * 1/1995 van der Pol .......... G01F 15/024
                                                    73/861.357

FOREIGN PATENT DOCUMENTS

| CH | 699615 B1 | 4/2010 | |
|---|---|---|---|
| DE | 102014205889 A1 | 10/2015 | |
| DE | 102017203616 A1 | 9/2018 | |
| DE | 102018129781 A1 | 5/2020 | |
| DE | 102017203616 B4 | 2/2022 | |
| EP | 3078894 A1 * | 10/2016 | ............ F16L 41/008 |
| EP | 3078894 A1 | 10/2016 | |

\* cited by examiner

*Primary Examiner* — Brandi N Hopkins
*Assistant Examiner* — Nigel H Plumb
(74) *Attorney, Agent, or Firm* — Patrick D. Duplessis (57) ABSTRACT

A measuring arrangement is disclosed that ensures safe installation and removal of a sensor relative to a wall of a measuring volume. The sensor is movably arranged in a mounting adapter that is fixedly arranged in the wall. The sensor is held in the mounting adapter by the connection of a coupling ring to the mounting adapter. A recess is provided for guiding a peg element. The position of the peg element in the recess is adjustable in, or counter to, the insertion direction of the sensor by a rotary and/or insertion movement of the coupling ring. The sensor and coupling ring are movable together by pressurization so that the peg element is arranged in a first locking position when pressurization by the medium is present in the measuring volume.

17 Claims, 3 Drawing Sheets

MEASURING ARRANGEMENT INCLUDING MOUNTING SYSTEM AND METHOD OF USE THEREOF

TECHNICAL FIELD

The invention is based on a measuring arrangement comprising a sensor unit, a measuring volume with a wall and a mounting system, wherein the sensor unit is fastened to the measuring volume by means of the mounting system, wherein the sensor unit penetrates the wall of the measuring volume so that the sensor unit is arranged at least partially in the interior of the measuring volume, wherein the mounting system comprises at least one mounting adapter and a coupling ring, wherein the mounting adapter is fixedly, in particular in a stationary manner, arranged in the wall of the measuring volume, wherein the sensor unit is movably arranged in the mounting adapter, wherein the coupling ring is connected to the sensor unit, and wherein the sensor unit is held in the mounting adapter by the connection of the coupling ring to the mounting adapter. In addition, the invention relates to a mounting system for connecting a sensor unit to a measuring volume, comprising at least one mounting adapter and at least one coupling ring, and a method for measuring pressure in a measurement volume.

BACKGROUND

In particular, pH or ORP sensors with plastic housings are usually mounted directly on pressurized pipelines for cost reasons. For this, conical ¾ or 1" NPT threads are used, which are integrated in the front area of the sensor housing. There are corresponding connection pieces with internal threads on the pipeline into which sensor housings are screwed.

As an alternative to the external threads on the sensor housing, simple intermediate adapters are used which can be mounted on a 1 or 1.5" NPT thread of the pipeline and then accommodate a plug-in sensor (twist-lock systems). The sensor is moved into the measuring position by a rotary movement, especially a quarter turn, and is held in place by two locking pins provided on the sensor. In most cases, an additional locking pin is also present to prevent unintentional release due to vibration.

Also known are systems with union nuts, which require a welding adapter or a thread adapter. Here, a plug-in sensor is also used, which is held by the union nut via pins or a flange. Depending on the design of the thread, approximately four to ten turns of the nut are required until the system is tight.

When attempting to remove a directly mounted sensor from a pipeline that is still pressurized by mistake, there is a considerable risk of injury to the user through contact with the escaping measured medium. A danger exists in particular if a pressure of, for example, 10 bar prevails in the pipeline and/or a temperature of over 50° C. is present and/or toxic, germ-contaminated or acidic or basic media are transported.

When directly-mounted NPT sensors are unscrewed, the measured medium flows past the thread exactly into the area where the user holds his hand or the tool when the process pressure is applied. He can also be hit directly in the face and upper body. It is then barely possible to tighten the sensor again and thus seal the leak. Larger quantities of measured medium can escape in an uncontrolled manner.

In addition, a sensor with a plastic housing can only be screwed to the line with a relatively low tightening torque, as there is a risk of breakage of the glass electrode when using tools. It is therefore possible that vibrations, in conjunction with the line pressure, will cause leakage with media escaping at the thread over time. Possible assembly errors lead to the same problem.

In the case of a twist-lock system, after the locking pin has been removed, the sensor can be rotated into the dismantling position and completely ejected from there by the line pressure. The measured medium then flows out uncontrolled from an opening approx. 25 mm in size, with a high risk of injury to the user.

In systems with a union nut, the measured medium escapes at various points after the union nut is loosened, including in the direction of the user in the area between the union nut and the sensor. Retightening the nut is then barely possible, or at least considerably more difficult. It is also possible for the union nut to loosen in systems with coarse threads due to vibrations. In this case, the coarse thread allows a considerable amount of the measured medium to escape after the sealing function has failed. If the leakage goes unnoticed over a long period of time, this can lead to considerable damage.

The mounting of the different connection systems also has various disadvantages.

When mounting directly mounted sensors with ¾ or 1" NPT threads, the sensor must be screwed in with approximately three to five full turns until the threaded connection is tight. A cable that is firmly mounted on the sensor will be severely twisted in the process, which—in the worst case—can lead to contact problems or cable breakage. In the case of plug-in head sensors, the plug must be loosened when removing the sensor for regular cleaning and/or calibration and then remounted for calibration. After calibration, the plug is removed again, the sensor is screwed down and the plug is mounted again. This leads to high wear of the plug contacts and consequently to an unstable or faulty measuring signal. In addition, the NPT thread must be resealed each time it is mounted. Common practice is to use liquid sealant and/or Teflon tape. To achieve a reliable sealing result, it is necessary to remove residues of the old sealant or Teflon tape before applying the new sealing material.

Twist-lock systems are convenient to use, since the insertion sensor is only turned approx. 90°. Here, the adapter itself can also be installed with a significantly higher tightening torque on the NPT thread than would be possible with the threaded installation of a sensor with a plastic housing.

In systems with a union nut, the insertion sensor is mounted in the adapter without turning. For systems with relatively coarse threads, at least three to four turns of the union nut are then required. For systems with fine threads, more than four, for example five to ten, turns of the union nut are required.

SUMMARY

Based on the prior art described, the object of the present invention to provide a measuring arrangement and a mounting system, wherein the measuring arrangement or the mounting system is convenient to use and wherein the measuring arrangement or the mounting system ensures safe installation and removal of the sensor unit. Furthermore, it is an object of the invention to disclose a method for measuring pressure in a measuring volume.

According to a first teaching, the aforementioned object is achieved by a measuring arrangement described at the beginning in that at least one peg element is present, that at least one recess with a guide contour is provided for receiving and guiding the at least one peg element, that the position of the peg element in the guide contour can be adjusted by at least one rotary movement of the coupling ring and/or by at least one insertion movement of the coupling ring in or counter to the direction of insertion of the sensor unit, that the guide contour permits movement of the sensor unit with the coupling ring in axial extension of the sensor unit from a first locking position into a second locking position, wherein it is possible for the sensor unit to be moved together with the coupling ring in the axial direction of extension of the sensor unit by pressurization, so that the peg element is arranged in the first locking position when pressurization by the medium is present in the measuring volume.

The peg element can be arranged in the second locking position when there is no pressurization by the medium in the measuring volume.

Particularly preferably, the sensor unit is a pH sensor or an ORP sensor.

According to one design, the sensor unit comprises a sensor adapter with which the sensor is arranged in the mounting adapter. According to this design, the sensor adapter is arranged in the mounting adapter and the sensor or the sensor housing is arranged, for example screwed, in the sensor adapter. In this case, the sensor adapter is preferably connected to the mounting adapter.

According to a preferred design, the at least one peg element is arranged on the mounting adapter and the at least one recess is arranged on the coupling ring.

According to an alternative design, the at least one peg element is arranged on the inside of the coupling ring and the at least one recess is arranged on the mounting adapter.

In addition, it is particularly preferred if at least two peg elements and at least two recesses are provided, each with a guide contour for receiving a peg element. In this case, the peg elements or the recesses are arranged opposite one another, which in particular improves the connection of the sensor unit to the mounting adapter.

According to the invention, in the mounted state of the sensor unit, for example by the position of the peg element, it is therefore possible to read from the outside whether the sensor unit is pressurized by the medium in the measuring volume and thus in particular whether there is excess pressure in the measuring volume.

Particularly preferably, a display element is provided that can be used to read whether there is an excess pressure in the measuring volume. For example, the display element can be designed as a colored element, in particular as a colored ring, wherein the colored ring is preferably arranged on the mounting adapter in such a way that it is only visible when the peg element is arranged in the first locking position.

It has been recognized that, by means of the design of the guide contour according to the invention, a connecting mechanism between the coupling ring and the mounting adapter can be combined with a mechanism for pressure control in the measuring volume. In this respect, in particular before the sensor unit is removed, it can be checked whether there is a pressurization by the medium in the measuring volume or an excess pressure in the measuring volume. If it is determined that there is relevant pressurization, the pressure can first be released from the measuring volume before the sensor unit is removed.

The sensor unit is preferably positively and/or non-positively connected to the coupling ring, for example by means of stop surfaces or by means of a snap-in connection, so that the coupling ring can be moved together with the sensor unit in the mounting adapter in accordance with the guide contour of the coupling ring in or against the direction of insertion of the sensor unit.

The disadvantages outlined above with regard to the risk that the medium may unintentionally escape from the measuring volume when the sensor unit is removed can thus be eliminated by means of the measuring arrangement according to the invention.

Furthermore, the sensor unit can also be mounted, i.e. installed and removed, particularly easily by means of the mounting system, as will be explained in more detail below.

According to a preferred design, the measuring volume is designed as a pipeline. Furthermore, it can also be designed as a container.

Particularly preferably, the recess is designed as a groove or a slot. In this case, the width of the recess is preferably slightly wider than the peg element, so that it is designed as a guide contour for the peg element.

According to the invention, the first locking position and the second locking position of the guide contour are arranged in such a way that, in the mounting state, the coupling ring is pushed out of the mounting adapter together with the sensor unit by pressurization by the medium in the measuring volume, so that the peg element is guided from the second locking position into the first locking position. This is particularly the case when excess pressure is present in the measuring volume.

When it is said that the peg element is guided from the second locking position to the first locking position, it means the change of the position of the peg element in the measuring volume, regardless of whether the guide contour moves around a stationary peg element or a peg element in a stationary guide contour.

In the context of the present invention, an excess pressure is understood to mean a pressure that is greater than the ambient pressure, in particular greater than 1 bar.

Particularly preferably, a resetting element, in particular a spring element, is provided which ensures by resetting force that the coupling ring reaches the second locking position when there is no pressurization by the medium in the measuring volume.

According to an alternative design, the coupling ring together with the sensor unit is held in the first locking position by at least one retaining element when an existing pressurization decreases. According to this design, it can be read from the outside whether pressurization by the medium in the measuring volume has occurred at least temporarily.

Preferably, the at least one retaining element is designed as a sealing ring. For this, the mounting adapter preferably has at least one groove on the inside, wherein the sealing ring is arranged as a retaining element in the groove and holds the coupling ring together with the sensor unit in the first locking position by frictional force when the pressurization by the medium decreases.

According to a particularly preferred design, the mounting adapter is designed as a screw-in adapter and the measuring volume has a connecting element with a thread. The mounting adapter can thus be screwed into the connecting element in an advantageous manner. Alternatively, the mounting adapter can also be designed as a weld-on adapter or the mounting adapter can be attached to the measuring volume via a flange connection.

If the sensor unit is designed as a plug-in sensor, it can be easily and replaceably plugged into the mounting adapter after the mounting adapter has been mounted. According to this design, the mounting adapter is connected once to the connection element before the sensor unit is installed. It does not have to be removed for disassembly of the sensor unit, for example for calibration of the sensor unit.

Furthermore, the mechanism of the connection between the mounting adapter and the coupling ring according to the invention allows the sensor unit to be mounted in a particularly uncomplicated manner. In particular, the sensor unit does not have to be screwed together, which would have a negative effect on the wiring of the sensor unit. In the simplest case, the sensor unit can simply be plugged into the mounting adapter as previously described. The coupling ring is connected to the mounting adapter by means of the guide contour with a combined plugging and rotating movement of the coupling ring. Preferably, the coupling ring is rotated by an angle of between 40° and 140°, particularly preferably by an angle of approximately 60° or of approximately 90°. This is particularly convenient in handling.

According to a particularly preferred embodiment, the at least one guide contour is designed in such a way that it permits a combination of at least two rotational movements of the coupling ring oriented perpendicular to the direction of insertion of the sensor unit and at least two insertion movements of the coupling ring in or against the direction of insertion of the sensor unit. According to this design, the guide contour is designed as a two-stage bayonet lock with the additional option that it is preferably possible to read whether there is an increased pressure in the measuring volume on the basis of the position of the at least one peg element.

Particularly preferably, the first locking position and/or the second locking position of the guide contour is formed such that when the peg element is arranged in the first locking position or in the second locking position of the guide contour, the coupling ring is locked against rotation. Particularly preferably, the first locking position and/or second locking position is designed as a positive lock in the direction of rotation of the coupling ring. For this, the first position and/or the second position is formed as a recess of the guide contour, which partially encloses the received peg element.

According to a further design, the guide contour has at least one service region and one measuring region, wherein the sensor unit can be installed and removed when the peg element is arranged in the service region, and wherein the sensor unit is held at the measuring volume when the peg element is arranged in the measuring region.

Particularly preferably, the peg element arrives at the measuring region starting from the service region by at least one insertion movement of the coupling ring in the direction of insertion of the sensor unit and by at least one rotational movement perpendicular to the direction of insertion of the sensor unit.

Also preferably, starting from the service region, the peg element enters the measuring region by a combination of a first insertion movement of the coupling ring in the direction of insertion, a first rotational movement of the coupling ring, a second insertion movement of the coupling ring in the direction of insertion of the sensor unit, and a second rotational movement perpendicular to the direction of insertion of the sensor unit.

Particularly preferably, the first locking position and/or the second locking position are arranged in the measuring region.

According to a likewise preferred embodiment, the first and second locking positions are arranged one behind the other in the insertion direction of the sensor unit. Thus, if there is excess pressure in the measuring volume during operation, the sensor unit together with the coupling ring is pushed out of the mounting adapter a short distance, for example a few millimeters. The coupling ring moves with the sensor unit so that the peg element is guided in the guide contour in the measuring region into the first locking position.

According to a further design, the guide contour has an intermediate region, wherein the intermediate region is located between the measuring region and the service region in the direction of rotation of the coupling ring, and wherein there is preferably a third locking position in the intermediate region, into which the peg element is guided when pressurization by the medium is present in the measuring volume. This intermediate region with the third locking position serves as an additional safeguard against unintentional release of the sensor unit if there is excess pressure in the measuring volume. If the coupling ring is inadvertently rotated from the measuring region towards the service region during operation, the at least one peg element in the intermediate region is guided into the third locking position, preventing further rotation of the coupling ring. The third locking position is also preferably designed as a positive lock to prevent rotation of the coupling ring. The third locking position is thus particularly preferably formed as a recess in the course of the guide contour, into which the peg element is guided in the presence of excess pressure in the measuring volume when the peg element is arranged in the intermediate region.

If there is pressurization by the medium in the measuring volume during operation, the coupling ring can only be moved from the measuring region to the service region by actively overcoming the counter-pressure and thus removing the sensor unit. Due to the counter-pressure, the peg element rubs against the edge regions of the guide contour during rotation of the coupling ring. According to one design, the edge regions of the guide contour are therefore designed in a structured manner, so that when the coupling ring is turned, the user also perceives haptically that there is pressurization by the medium in the measuring volume.

For sealing the connection between the coupling ring and the sensor unit, according to a further preferred design, the coupling ring has at least one internal groove in which a sealing ring is arranged.

Further preferably, the mounting adapter has at least one internal groove in which a sealing ring is arranged for sealing the area between the mounting adapter and the sensor unit. The sealing ring can simultaneously fulfill the above-described function of a retaining element that holds the combination of the sensor unit and the coupling ring in the first locking position when pressurization is released.

According to a further design, there may also be two or more internal grooves, in each of which a sealing ring is arranged, which serves both to provide a seal and to perform the function of a retaining element.

According to a second teaching of the present invention, the above-mentioned problem is solved by a mounting system described at the outset in that the mounting system is designed to produce one of the measuring arrangements described above. In detail, the mounting system has one or more of the previously described features.

According to a third teaching of the present invention, the object set out at the beginning is achieved by a method for pressure measurement described at the beginning in that the peg element is brought into the second locking position by pressing the coupling ring, preferably from the first locking position, so that the peg element is guided into the first locking position by pressurization by the medium in the measuring volume, or so that the peg element remains in the second locking position when there is no pressurization.

Within the scope of the present invention, it is not possible to determine absolute values for the pressure in the measuring volume, but it is possible to at least capture whether there is a lot or a little excess pressure in the measuring volume, in particular by perceiving the force with which the coupling ring is moved.

Furthermore, in order to check whether there is a low pressurization, the coupling ring can be moved a few times from the first locking position to the second locking position, whereby, in the case of a low pressurization in the measuring volume, the movement of the coupling ring in the direction of insertion of the sensor unit requires higher forces than the movement against the direction of insertion.

According to a further design of the method, wherein the guide contour has at least one service region in which the sensor unit can be inserted and removed, a measuring region in which the sensor unit is held at the measuring volume, and an intermediate region, wherein the intermediate region is located between the measuring region and the service region in the direction of rotation of the coupling ring, wherein the first locking position and/or the second locking position are located in the measuring region and wherein a third locking position is present in the intermediate region, wherein when the coupling ring is actively rotated from the measuring region into the service region, the peg element is guided into the third locking position when pressurization by the medium is present in the measuring volume, so that further rotation of the coupling ring can only take place by actively pressing the coupling ring against the pressurization.

BRIEF DESCRIPTION OF THE DRAWINGS

There are now a large number of possibilities for designing and further developing the measuring arrangement according to the invention, the mounting system according to the invention and the method according to the invention. Reference is thus made to the following description of preferred embodiments in conjunction with the drawings.

DETAILED DESCRIPTION

Figure 1:
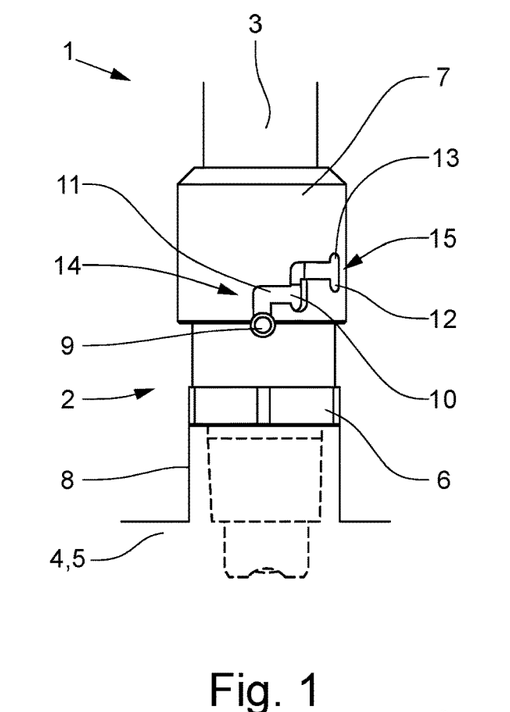
FIG. 1 illustrates a first embodiment of a measuring arrangement and mounting system, wherein the peg element is arranged in the service region.

FIG. 1 shows a first embodiment of a measuring arrangement 1 comprising a mounting system 2, a sensor unit 3 and a measuring volume 4 in the form of a pipeline 5. The sensor unit 3 is attached to the pipeline 5 by means of the mounting system 2, so that the sensor unit 3 is arranged at least partially in the interior of the pipeline 5. The mounting system 2 comprises a mounting adapter 6 and a coupling ring 7, wherein the sensor unit 3 is arranged in the mounting adapter 6 and wherein the mounting adapter 6 is fixedly connected to the connecting element 8 of the pipeline 5.

In the illustrated embodiment, the connecting element 8 has a thread, and the mounting adapter 6 is designed as a screw-in adapter. In another embodiment, the connecting element may also comprise another intermediate adapter, provided that an adaptation to the diameter of the connecting element is required. The sensor unit 3 is designed as a plug-in sensor, which is plugged into the mounting adapter 6, so that the sensor unit 3 is arranged movably in the mounting adapter 6.

The coupling ring 7 is designed for connection to the mounting adapter 6. For this, the mounting adapter 6 has a peg element 9 and the coupling ring 7 has a recess 10 with a guide contour 11 for receiving the peg element 9. In the illustrated embodiment, the recess 10 is designed as a slot. The position of the peg element 9 in the guide contour 11 can be changed by at least one rotary movement and by at least one insertion movement of the coupling ring 7 in or against the direction of insertion of the sensor unit 3. Overall, the guide contour 11 has the form of a two-stage bayonet lock, so that the coupling ring 7 can be connected to the mounting adapter 6 via this bayonet lock and thus the sensor unit 3 is held in the mounting adapter 6.

For locking against rotation of the coupling ring 7, the guide contour 11 has a first locking position 12, wherein the peg element 9 is guided into the first locking position 12 during operation when excess pressure is present in the pipeline 5. Furthermore, the guide contour has a second locking position 13, wherein the peg element 9 can be guided into the second locking position 13 during operation when there is no excess pressure in the pipeline 5. This can be done automatically with a resetting force when an existing excess pressure decreases. Alternatively, in this situation, the coupling ring 7 together with the sensor unit 3 can initially be held in the first locking position by a retaining element, so that the transfer to the second locking position is actively performed by the user.

The first locking position 12 and the second locking position 13 are both designed as a positive lock in the direction of rotation of the coupling ring 7, so that accidental opening of the connection of the coupling ring 7 with the mounting adapter 6 is prevented, for example by vibration.

In addition, the guide contour 11 has a service region 14, wherein the sensor unit 3 can be installed or removed when the peg element 9 is arranged in the service region 14, and a measuring region 15, wherein the sensor unit 3 is held on the pipeline 5 when the peg element 9 is arranged in the measuring region 15.

In the illustrated embodiment, the peg element 9 is arranged in the service region 14, so the embodiment shows the situation in which in the sensor unit 3 is attached to the pipeline 5.

Figure 2:
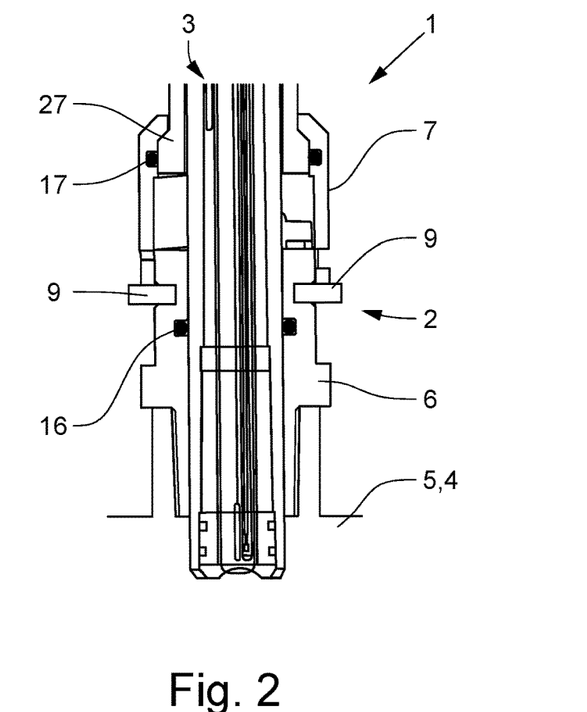
FIG. 2 illustrates an embodiment of the measuring arrangement and the mounting system in longitudinal section.

FIG. 2 shows an embodiment of the measuring arrangement 1 and the mounting system 2 in longitudinal cross-section. It can be seen that the mounting adapter 6 has two peg elements 9, which are arranged opposite each other. Accordingly, the coupling ring 7 has two recesses 10 with guide contours 11, wherein one recess 10 or one guide contour 11 is formed in each case for receiving a peg element 9. In the illustrated embodiment, the sensor unit 3 comprises an additional sensor adapter 27. In the illustrated embodiment, the sensor or the sensor housing is screwed into the sensor adapter 27 and the sensor adapter 27 is inserted into the mounting adapter 6.

A sealing ring 16 is arranged between the mounting adapter 6 and the sensor unit 3 for sealing. In addition, another sealing ring 17 is arranged between the coupling ring 7 and the sensor unit 3 for sealing. The sealing ring 16 also has the function of holding the coupling ring 7 together with the sensor unit 3 in the first locking position 12 when there is only temporary excess pressure in the measuring volume. According to the illustrated embodiment, the combination of the coupling ring 7 and the sensor unit 3 remains in the first locking position 12 when an excess pressure present in the measuring volume decreases.

Figure 3:
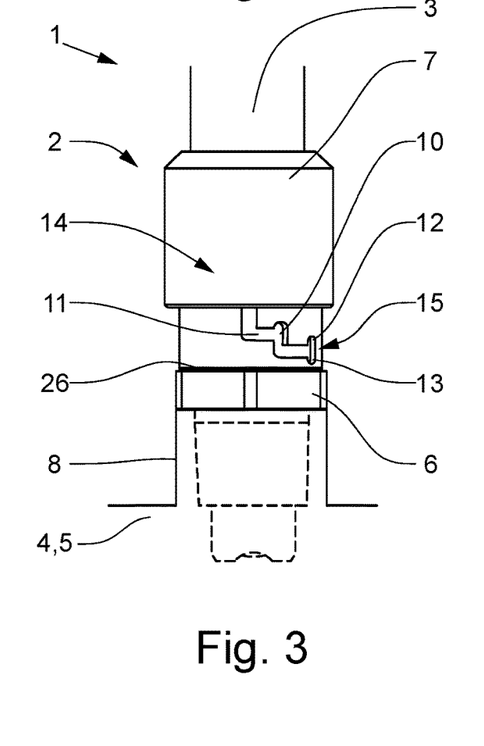
FIG. 3 illustrates a further embodiment of a measuring arrangement.

FIG. 3 shows an embodiment of a measuring arrangement 1 comprising a mounting system 2, a sensor unit 3 and a measuring volume 4, wherein, in contrast to the embodiment shown in FIG. 1, the recess 10 with the guide contour 11 is arranged on the mounting adapter 6 and the peg element 9 is arranged inside the coupling ring 7, i.e. not visible here. A display element 26 in the form of a colored ring is present under the recess 10. This colored ring is visible during operation, i.e. when the peg element 9 is arranged in the measuring region 15, only when the peg element 9 is arranged in the first locking position 12, i.e. when there is at least temporarily pressurization by the medium in the measuring volume 4.

Figure 4:
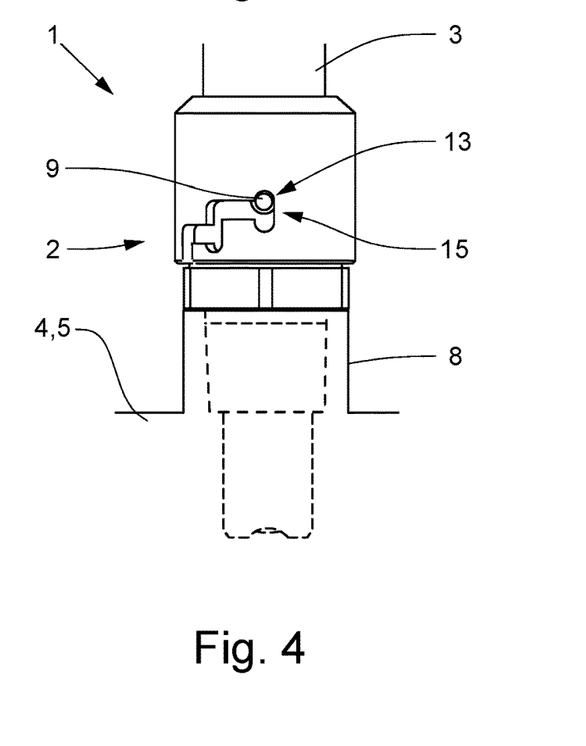
FIG. 4 illustrates the first embodiment of the measuring arrangement and the mounting system, wherein the peg element is arranged in the second locking position.

FIG. 4 shows the first embodiment of the measuring arrangement 1 or the mounting system 2, wherein the peg element 9 is arranged in the second locking position 13 in the measuring region 15. In the illustrated embodiment, therefore, there is no excess pressure at the pipeline 5. In addition, the sensor unit 3 is fixed to the pipeline 5, since the coupling ring 7 is locked against rotation by the positive connection to the mounting adapter 6.

Figure 5:
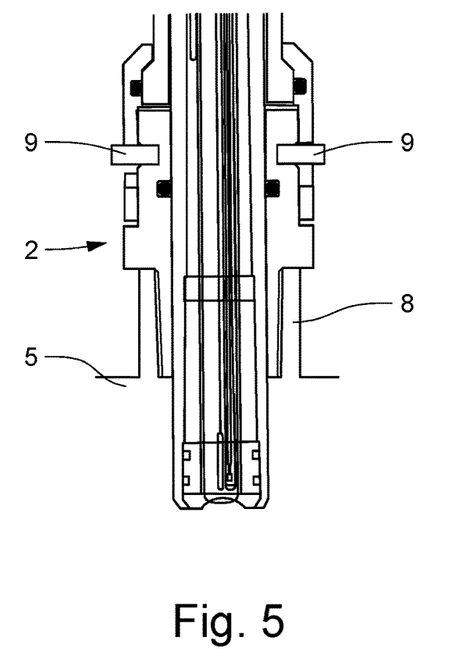
FIG. 5 illustrates the embodiment shown in FIG. 4 in longitudinal cross-section.

FIG. 5 shows the situation illustrated in FIG. 4 for mounting the sensor unit 3 on a pipeline 5 in longitudinal cross-section.

Figure 6:
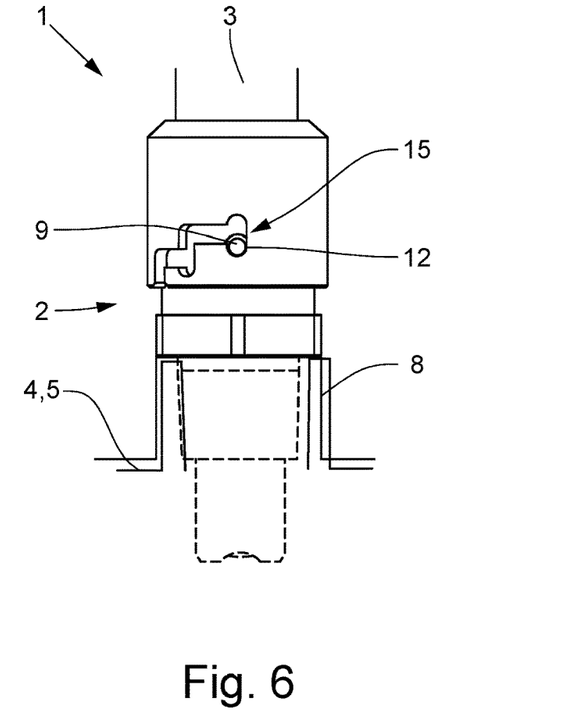
FIG. 6 illustrates the first embodiment of a measuring arrangement and mounting system, wherein the peg element is arranged in the first locking position.

FIG. 6 shows the first embodiment of the measuring arrangement 1 or the mounting system 2, wherein the peg element 9 is arranged in the first locking position 12 in the measuring region 15. In this position, the sensor unit 3 with the coupling ring 7 is minimally lifted out of the mounting adapter 6 by the excess pressure in the pipeline 5 so that the peg element 9 is guided into the first locking position 12. It is therefore visible to the user from the outside that there is excess pressure in the pipeline 5, so that he is warned against removing the sensor unit 3 from the pipeline without releasing the excess pressure.

Figure 7:
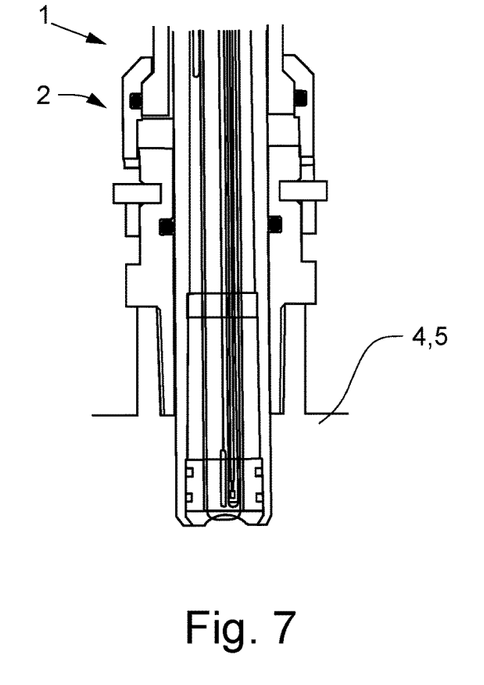
FIG. 7 illustrates the embodiment shown in FIG. 6 in longitudinal cross-section.

FIG. 7 shows the embodiment shown in FIG. 6 in longitudinal cross-section.

Figure 8:
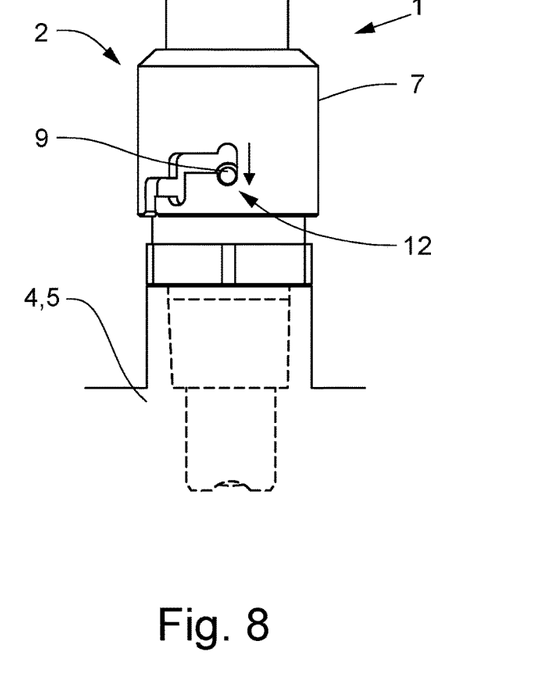
FIG. 8 illustrates the result of a pressure check when excess pressure is present in the measuring volume.

In order to determine during operation whether there is excess pressure on the pipeline 5, a pressure check can be carried out before the sensor unit 3 is removed. For this, the coupling ring 7 is pressed in the direction of insertion of the sensor unit 3 when the peg element 9 is arranged in the measuring region 15. If there is excess pressure in the pipeline 5, the sensor unit 3 is pressed out of the mounting adapter 6 together with the coupling ring 7 so that the peg element 9 is guided into the first locking position 12. This is shown in FIG. 8.

Figure 9:
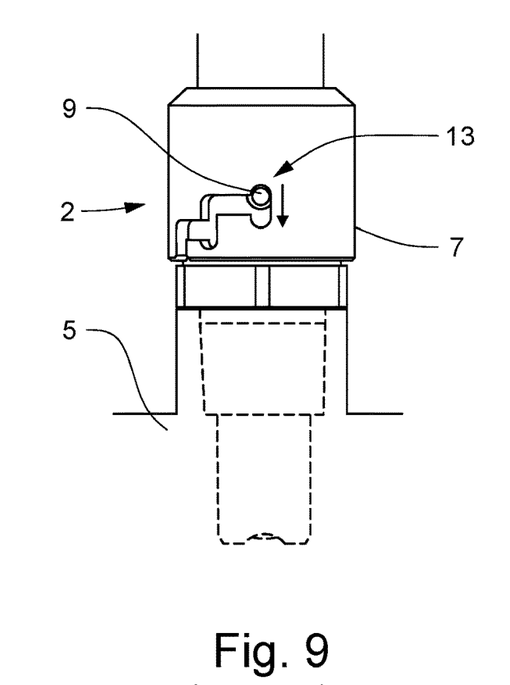
FIG. 9 illustrates the result of a pressure check when there is no excess pressure in the measuring volume.

If there is no excess pressure in the pipeline, the coupling ring 7 remains in such a way that the peg element 9 is arranged in the second locking position 13. This is shown in FIG. 9.

In addition to the service region 14 and the measuring region 15, the guide contour 11 also has an intermediate region 18, which is located between the service region 14 and the measuring region 15 in the direction of rotation of the coupling ring 7.

Figure 10:
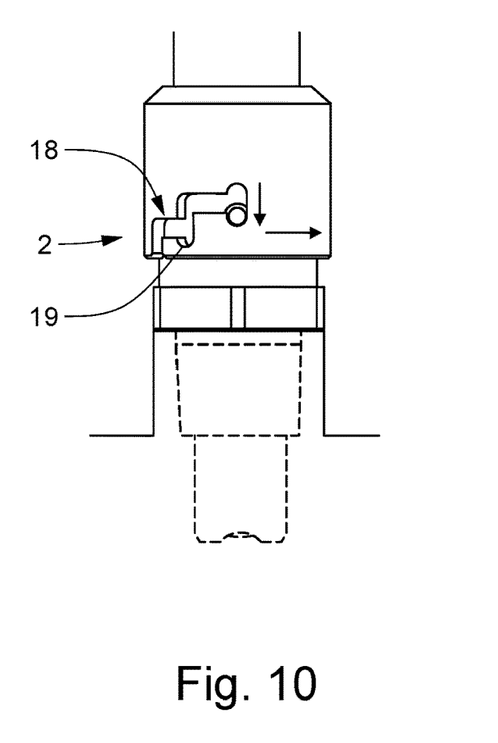
FIG. 10 illustrates the movement process to move the coupling ring from the measuring region to the service region.
Figure 11:
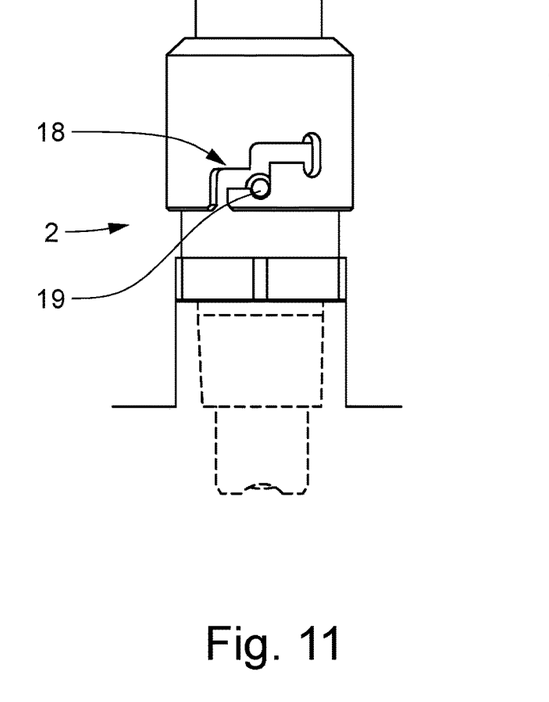
FIG. 11 illustrates the embodiment of the measuring arrangement and the mounting system when the peg element is arranged in the third locking position.

FIG. 10 shows that, starting from the first locking position 12 in the measuring region 15, the intermediate region 18 is reached by first pressing the coupling ring 7 in the direction of insertion and then rotating it. If the peg element 9 is in the intermediate region 18 and an excess pressure is applied to the pipeline 5, the peg element 9 is guided into a third locking position 19. This is shown in FIG. 11. The third locking position 19 is also designed as a positive lock in the direction of rotation of the coupling ring 7, so that the coupling ring 7 is secured against further rotation.

Accidental removal of the sensor unit 3, even though there is excess pressure in the pipeline 5, is thus further prevented. In this respect, the intermediate region 18 with the third locking position 19 represents a further safeguard against unintentional removal of the sensor unit 3 in the presence of excess pressure in the pipeline 5.

Figure 12:
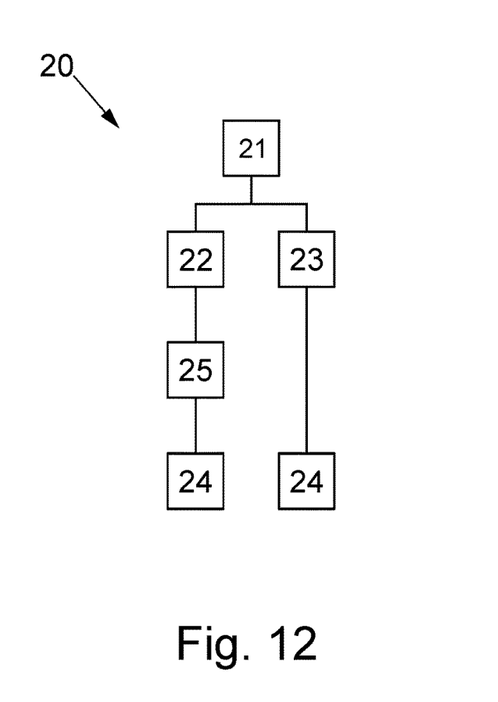
FIG. 12 illustrates a first embodiment of a method according to the invention.

FIG. 12 shows a first embodiment of a method 20 for measuring the pressurization of the sensor unit 3 by the medium in the measuring volume 4, in detail in the pipeline 5 in a measuring arrangement 1, which is constructed as shown in FIG. 1.

In a first step 21, the peg element 9 is brought from the first locking position 12 to the second locking position 13 by pressing the coupling ring 7.

If there is pressurization by the medium in the pipeline 5, the peg element 9 is moved back 22 to the first locking position. Before removal 24 of the sensor unit 3, the excess pressure must first be released 25.

If there is no excess pressure in the pipeline, the peg element 9 remains 23 in the second locking position 13 and the sensor unit can be removed 24.

In an advantageous manner, it is thus possible to check whether there is a relevant excess pressure in the pipeline before removing the sensor unit 3, which could lead to an uncontrolled discharge of the medium from the pipeline when the sensor unit is removed.

The invention claimed is:
1. A measuring arrangement, comprising:
a sensor unit;
a measuring volume having a wall; and
a mounting system;
wherein the sensor unit is fastened to the measuring volume by the mounting system;
wherein the sensor unit penetrates the wall of the measuring volume, so that the sensor unit is arranged at least partially in the interior of the measuring volume;
wherein the mounting system includes at least one mounting adapter and a coupling ring;
wherein the mounting adapter is fixedly arranged in the wall of the measuring volume;

wherein the sensor unit is movably arranged in the mounting adapter;
wherein the coupling ring is connected to the sensor unit;
wherein the sensor unit is held in the mounting adapter by the connection of the coupling ring to the mounting adapter;
wherein at least one peg element is provided;
wherein at least one recess with a guide contour is provided for receiving and guiding the at least one peg element;
wherein the position of the peg element in the guide contour can be adjusted in or counter to the insertion direction of the sensor unit by at least one rotary movement of the coupling ring and/or by at least one insertion movement of the coupling ring;
wherein the guide contour permits movement of the sensor unit with the coupling ring in axial extension of the sensor unit from a first locking position into a second locking position; and
wherein the sensor unit and the coupling ring are movable together in the axial direction of extension of the sensor unit by pressurization so that the peg element is arranged in the first locking position when pressurization by the medium is present in the measuring volume.

2. The measuring arrangement according to claim 1, wherein the at least one peg element is arranged on the mounting adapter; and
wherein the at least one recess is arranged on the coupling ring.

3. The measuring arrangement according to claim 1, wherein the at least one peg element is arranged on the inside of the coupling ring; and
wherein the at least one recess is arranged on the mounting adapter.

4. The measuring arrangement according to claim 1, wherein at least one resetting element is present which ensures by resetting force that the peg element is arranged in the second locking position when there is no pressurization by the medium in the measuring volume; or
wherein at least one holding element is present which holds the coupling ring together with the sensor unit in the first locking position when an existing pressurization decreases.

5. The measuring arrangement according to claim 1, wherein the mounting adapter is designed as a screw-in adapter; and
wherein the measuring volume has a connecting element with a threading, or the mounting adapter is designed as a weld-on adapter, or the mounting adapter is fastened to the measuring volume via a flange connection.

6. The measuring arrangement according to claim 1, wherein the at least one guide contour is designed in such a way that it permits a combination of at least two rotational movements, oriented perpendicular to the direction of insertion of the sensor unit, of the coupling ring and at least two insertion movements of the coupling ring in or against the direction of insertion of the sensor unit.

7. The measuring arrangement according to claim 1, wherein the first locking position and/or the second locking position of the guide contour are designed in such a way that when the peg element is arranged in the first locking position or in the second locking position of the guide contour, the coupling ring is locked against rotation.

8. The measuring arrangement according to claim 1, wherein the guide contour has at least one service region and one measuring region;
wherein the sensor unit can be installed and removed when the peg element is arranged in the service region; and
wherein the sensor unit is held at the measuring volume when the peg element is arranged in the measuring region.

9. The measuring arrangement according to claim 8, wherein the guide contour has an intermediate region;
wherein the intermediate region is located between the measuring region and the service region in the direction of rotation of the coupling ring; and
wherein there is a third locking position in the intermediate region, into which the peg element is guided when pressurization by the medium is present in the measuring volume.

10. The measuring arrangement according to claim 1, wherein the first locking position and/or the second locking position are arranged in the measuring region.

11. The measuring arrangement according to claim 1, wherein the first locking position and the second locking position are arranged one behind the other in the plug-in direction of the sensor unit.

12. The measuring arrangement according to claim 1, wherein the coupling ring has at least one internal groove in which a sealing ring is accommodated.

13. The measuring arrangement according to claim 1, wherein the mounting adapter has at least one internal groove in which a sealing ring is accommodated.

14. A mounting system for connecting a sensor unit to a measuring volume, comprising:
at least one mounting adapter; and
at least one coupling ring;
wherein the mounting system is designed for producing a measuring arrangement in which the sensor unit is fastened to the measuring volume by the mounting system;
wherein the sensor unit penetrates a wall of the measuring volume, so that the sensor unit is arranged at least partially in the interior of the measuring volume;
wherein the mounting system includes at least one mounting adapter and a coupling ring;
wherein the mounting adapter is fixedly arranged in the wall of the measuring volume;
wherein the sensor unit is movably arranged in the mounting adapter;
wherein the coupling ring is connected to the sensor unit;
wherein the sensor unit is held in the mounting adapter by the connection of the coupling ring to the mounting adapter;
wherein at least one peg element is provided;
wherein at least one recess with a guide contour is provided for receiving and guiding the at least one peg element;
wherein the position of the peg element in the guide contour can be adjusted in or counter to the insertion direction of the sensor unit by at least one rotary movement of the coupling ring and/or by at least one insertion movement of the coupling ring;
wherein the guide contour permits movement of the sensor unit with the coupling ring in axial extension of the sensor unit from a first locking position into a second locking position; and
wherein the sensor unit and the coupling ring are movable together in the axial direction of extension of the sensor unit by pressurization so that the peg element is arranged in the first locking position when pressurization by the medium is present in the measuring volume.

15. A method for measuring pressure in a measuring volume in a measuring arrangement including a sensor unit and a mounting system, wherein the sensor unit is fastened to the measuring volume by the mounting system, wherein the sensor unit penetrates a wall of the measuring volume, so that the sensor unit is arranged at least partially in the interior of the measuring volume, wherein the mounting system includes at least one mounting adapter and a coupling ring, wherein the mounting adapter is fixedly arranged in the wall of the measuring volume, wherein the sensor unit is movably arranged in the mounting adapter, wherein the coupling ring is connected to the sensor unit, wherein the sensor unit is held in the mounting adapter by the connection of the coupling ring to the mounting adapter, wherein at least one peg element is provided, wherein at least one recess with a guide contour is provided for receiving and guiding the at least one peg element, wherein the position of the peg element in the guide contour can be adjusted in or counter to the insertion direction of the sensor unit by at least one rotary movement of the coupling ring and/or by at least one insertion movement of the coupling ring, wherein the guide contour permits movement of the sensor unit with the coupling ring in axial extension of the sensor unit from a first locking position into a second locking position, and wherein the sensor unit and the coupling ring are movable together in the axial direction of extension of the sensor unit by pressurization so that the peg element is arranged in the first locking position when pressurization by the medium is present in the measuring volume, the method comprising:

bringing the peg element into the second locking position by pressing the coupling ring from the first locking position, so that the peg element is guided into the first locking position by pressurization by the medium in the measuring volume, or so that the peg element remains in the second locking position when there is no pressurization.

16. The method according to claim 15, further comprising, in order to check whether there is a low pressurization, moving the coupling ring a few times from the first locking position into the second locking position;

wherein the movement of the coupling ring in the direction of insertion of the sensor unit requires greater forces than the movement against the direction of insertion in the case of a low pressurization by the medium in the measuring volume.

17. The method according to claim 15, wherein the guide contour has at least one service region, in which the sensor unit can be inserted and removed, a measuring region, in which the sensor unit is held at the measuring volume, and an intermediate region;

wherein the intermediate region is arranged between the measuring region and the service region in the direction of rotation of the coupling ring;

wherein the first locking position and/or the second locking position are arranged in the measuring region and a third locking position is present in the intermediate region; and wherein when the coupling ring is actively rotated from the measuring region into the service region, the peg element is guided into the third locking position when pressurization by the medium is present in the measuring volume, so that further rotation of the coupling ring can only be effected by actively pressing the coupling ring against the pressurization.

\* \* \* \* \*